Inventor:
LASZLO SZIGETH

United States Patent Office 3,636,152
Patented Jan. 18, 1972

3,636,152
METHOD FOR THE CATALYTIC HYDROGENATION OF ORGANIC NITRO DERIVATIVES IN THE GASEOUS STATE TO CORRESPONDING AMINES
Laszlo Szigeth, Basel, Switzerland, assignor to Lonza Ltd., Basel, Switzerland
Filed Nov. 25, 1968, Ser. No. 778,524
Claims priority, application Switzerland, Dec. 12, 1967, 16,900/67
Int. Cl. C07c 85/10
U.S. Cl. 260—580
1 Claim

ABSTRACT OF THE DISCLOSURE

A process for the catalytic hydrogenation of organic nitro derivatives into amines including evaporating a liquid nitro derivative in a hot stream of gas comprised substantially of hydrogen by atomizing the nitro derivative with the aid of hydrogen, circulating the stream of gas in a closed circuit to cause catalytic hydrogenation of the stream of gas, condensation of reaction products and return of the nitro derivative to a fluid state, and separating amines from the condensed reaction products.

---

The invention relates to a method for the catalytic hydrogenation of organic nitro derivatives in the gaseous state to corresponding amines, in which the liquid nitro derivative is evaporated in a hot gas stream comprised substantially of hydrogen and adapted to circulate in a circuit in which the gas stream, loaded with the evaporated nitro derivative, is induced to hydrogenate catalytically, reaction products being condensed and nitro derivatives, wihch have once again become liquid, being evaporated in the gas stream, the amines being separated from the condensed reaction products.

This method is used for example for the evaporation of liquid nitrobenzene in a circulating stream of gas containing hydrogen, the stream of gas, loaded with the evaporated nitrobenzene, being hydrogenated in a contact reactor containing copper as catalyst, the reaction products being condensed and aniline being separated from the condensate.

Owing to the widely different specific gravities of the reaction participants in known methods of the kind heretofore mentioned, the evaporated organic nitro derivative is only incompletely mixed with the stream of gas containing the hydrogen. The stream of gas which is hydrogenated therefore contains strata or striations having a partially higher and partially lower nitro derivative content. Accordingly, the catalyst is not uniformly loaded, that is to say during hydrogenation it is overloaded at some positions and it is not utilised at other positions. At the positions at which it is overloaded hydrogenation does not take place with the desired success while furthermore, overheating takes place which leads to inactivation of the catalyst since the stream of gas will not be sufficient to dissipate the reaction heat from the afore-mentioned positions.

The provision of mixing chicanes in the stream of gas according to a known proposal for the more uniform distribution of the evaporated nitro derivative did not allow sufficient homogenisation thereof.

It is the object of the invention to achieve a homogeneous distribution of the nitro derivatives to be hydrogenated in the stream of gas which is supplied to the contact reactor.

According to the invention this is achieved in that the nitro derivative is atomised into the circulating, hot stream of gas by means of hydrogen which serves as atomising gas.

Figure 1:
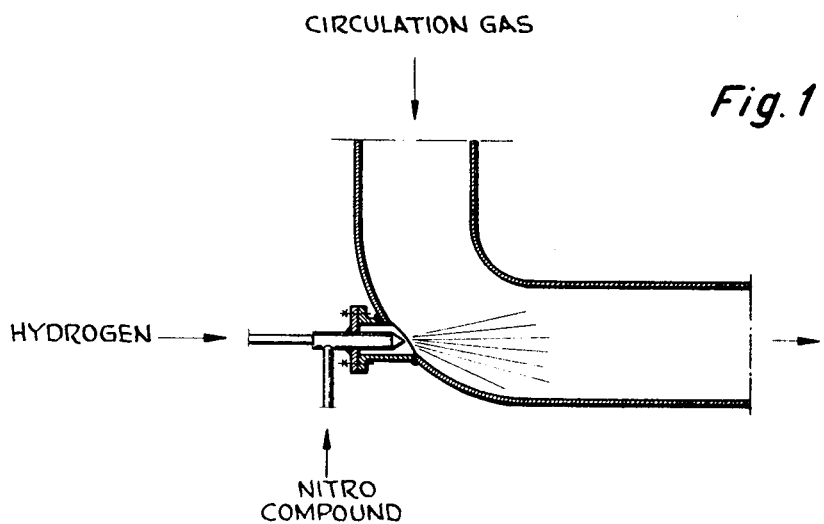

The nitro derivative can be atomised into the stream of gas through an atomising nozzle of known kind disposed on the exterior of a bend of the circulating gas stream by means of the hydrogen which serves as atomising gas (FIG. 1).

Figure 2:
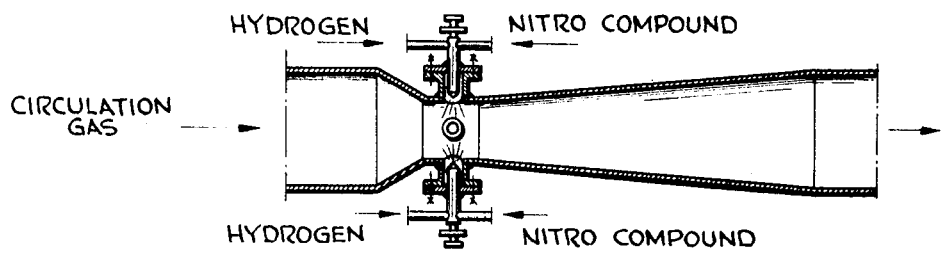

In a preferred embodiment the circulating gas stream is constricted and the nitro derivative is atomised into the gas stream at the constricted position and by means of the atomising gas (FIG. 2).

The nitro derivative to be hydrogenated, for example nitrobenzene, is atomised with the hydrogen serving as atomising gas, a mol ratio of at least 1:2, but preferably 1:2.5 to 1:6, being appropriately employed. Since a substantial constituent of the circulating stream of gas contains hydrogen, it is possible for part of said stream of gas to be branched off and to be employed as atomising gas for atomising the nitro derivative. However, it is more appropriate to employ fresh hydrogen. The pressure of the atomising gas is appropriately at least 2, but preferably 2 to 15 atm. gauge. Between the position at which the circulating stream of gas is discharged from the condensers in which the reaction products are condensed, and the entry of said gas into the contact reactor, in which hydrogenation is performed, said gas is ducted through a pre-heater and is pre-heated therein to a temperature above the nitro derivative evaporation temperature corresponding to the partial pressure, preferably to a temperature of between 150 to 300° C., the nitro derivative being atomised in the pre-heated part of the stream of gas. Pre-heating is appropriately performed in a heat exchanger one of whose flow paths carries the gas stream from the contact reactor to the condensers while the stream of gas from the condensers to the contact reactor flows through the other flow path. This assists the cooling of the gas sream required for condensing the reaction products. Atomisation of the nitro derivative with the hydrogen serving as atomising gas ensures a particularly finely graded distribution of the liquid nitro derivative for the following reasons: since the ratio of surface or thermal contact surface area to mass or thermal capacity of the spherical droplets of the atomised nitro derivative is inversely proportional to the droplet diameter, it follows that smaller droplets are heated and evaporated more rapidly in the stream of gas so that the nitro derivative, finely atomised by means of the hydrogen, evaporates practically instantly. Moreover, the density of the mixture comprising the hydrogen, which serves for atomisation, and the evaporated nitro derivative is approximately equal to the density of the circulating gas.

Homogeneous mixing of the hydrogen containing the evaporated nitro derivative with the circulating stream of gas comprising substantially of hydrogen is thus ensured.

EXAMPLE

A stream of gas, substantially comprised of hydrogen, was circulated in a closed circuit through a contact reactor and a condenser, the flow being conducted from the contact reactor to the condenser through a first flow path of a heat exchanger and the flow from the condenser to the contact reactor being ducted through the second flow path of the heat exchanger. The contact reactor contained a copper catalyst on pumice. The closed circuit was provided with a constriction disposed between the second flow path of the heat exchanger and the contact reactor. Four atomiser nozzles were mounted at the constricted position in order to enable nitrobenzene to be atomised into the circulating stream of gas by means of hydrogen acting as atomising gas (FIG. 2).

The flow rate amounted to 3090 kg./h. Hydrogen at the rate of 2008 kg./h., water vapour at the rate of 954 kg./h. and aniline at the rate of 128 kg./h. were passed in the flow direction upstream of the constricted position. The temperature at the afore-mentioned position was 240° C.

Nitrobenzene was atomised at the rate of 1378 kg./h. through the atomiser nozzles into the circulating stream of gas with the aid of 69 kg./h. fresh hydrogen at a pressure of 8 atm. gauge, the finely divided nitrobenzene evaporating instantly and completely under these conditions. Accordingly, the temperature in the flow direction downstream of the constricted position dropped to 215° C. This procedure resulted in homogenous mixing of the circulating stream of gas with the evaporated nitrobenzene and the fresh hydrogen employed for atomising said nitrobenzene. The afore-mentioned mixture was hydrogenated in the contact reactor after which it acquired a temperature of 325° C. After giving up heat in the first flow path of the heat exchanger, the stream of gas was further cooled in the condenser, the condensable proportions, namely aniline and water, being segregated. The uncondensable gaseous residue of the stream of gas was heated to 240° C. in the second flow path of the heat exchanger and returned at this temperature to the restricted position at which nitrobenzene was atomised into the stream of gas by means of fresh hydrogen. Aniline was obtained at the rate of 1000 kg./h., corresponding to a yield of 96% referred to the nitrobenzene charged into the process.

This process achieved a uniform loading of the catalyst, evidenced by a substantially uniform temperature distribution in all cross-sections of the reactor. The temperature in the contact reactor rose uniformly from cross-section to cross-section from 215 to approximately 325° C. No overheating was noted. Accordingly, it became possible to increase the working life of the catalyst. The period of time required between regeneration cycles of the catalyst was tripled.

What we claim is:

1. A process for the catalytic hydrogenation of nitrobenzene in the gaseous state into the corresponding amines which comprises evaporating liquid said nitrobenzene in a hot stream of gas comprised of hydrogen, wherein the mol ratio of said nitrobenzene to hydrogen being 1:2.5 to 1:6, wherein said stream of gas is circulated in a closed circuit, wherein said stream of hot gas has a temperature between 150° and 300° C., wherein said nitrobenzene is atomised in said stream of hot gas with said hydrogen serving as an atomising gas, and wherein said hot gas comprised of hydrogen for atomisation has a pressure of at least 2 atmospheres gauge catalytically hydrogenating said nitrobenzene in said hot gas stream to form reaction products containing said amine, condensing said reaction products of said hydrogenation steps so that said reaction products becomes liquid, and separating said amine from said condensed reaction products.

References Cited

UNITED STATES PATENTS 3,278,603   10/1966   Cooke _____ 260—580

CHARLES B. PARKER, Primary Examiner

R. L. RAYMOND, Assistant Examiner

U.S. Cl. X.R.

23—288; 260—583 M

UNITED STATES PATENT OFFICE
CERTIFICATE OF CORRECTION

Patent No. 3,636,152      Dated January 18, 1972

Inventor(s) Laszlo Szigeth

It is certified that error appears in the above-identified patent and that said Letters Patent are hereby corrected as shown below:

In the heading to the printed specification, line 9,

"Dec. 12, 1967" should read -- Dec. 1, 1967 --.

Signed and sealed this 26th day of September 1972, (SEAL)
Attest:

EDWARD M. FLETCHER, JR.       ROBERT GOTTSCHALK
Attesting Officer      Commissioner of Patents